W. A. TURBAYNE.
ELECTRICAL SYSTEM OF DISTRIBUTION.
APPLICATION FILED FEB. 21, 1908.
987,270.
Patented Mar. 21, 1911.
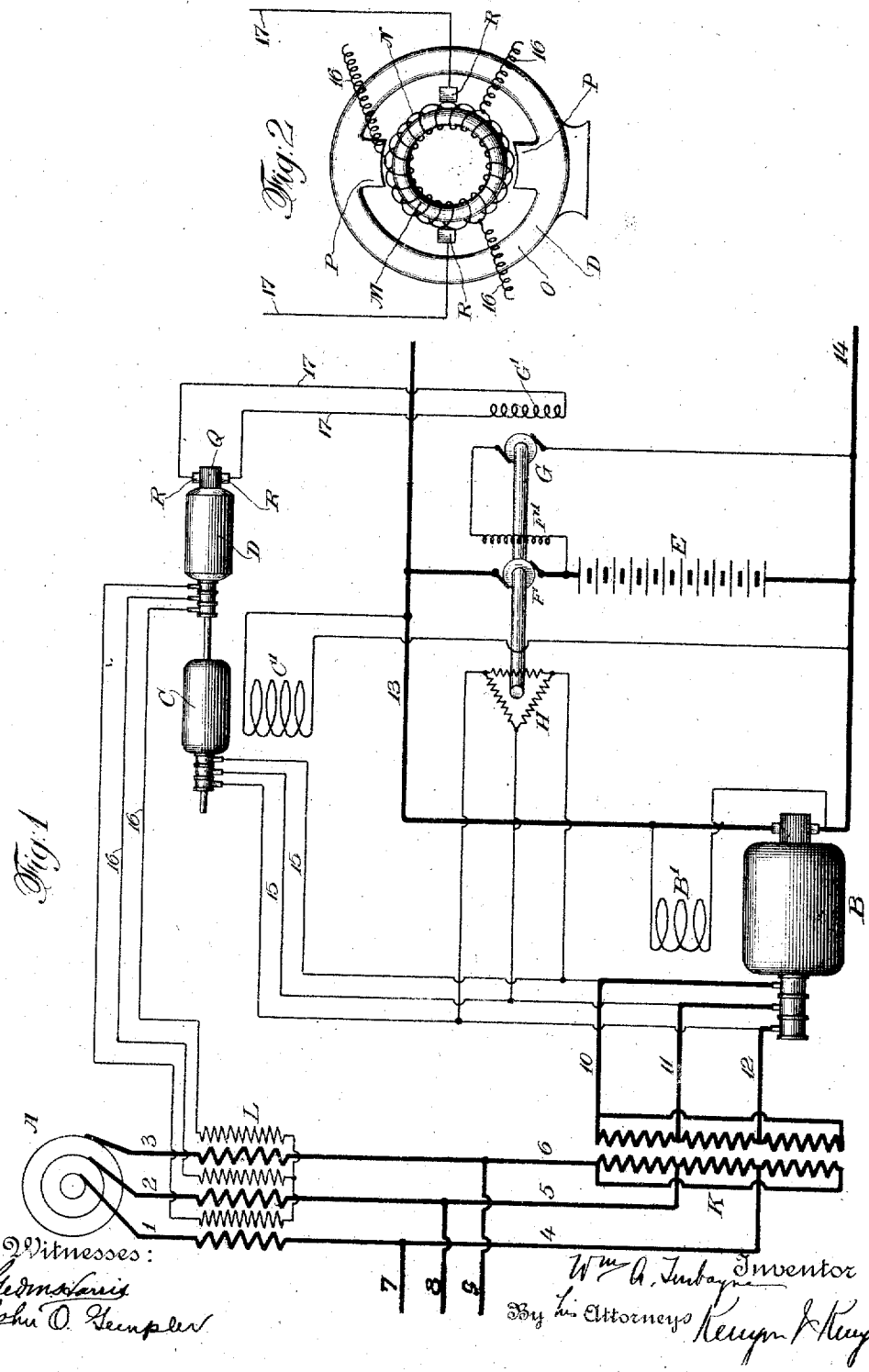

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

987,270.

Specification of Letters Patent.

Patented Mar. 21, 1911.

Application filed February 21, 1908. Serial No. 417,060.

*To all whom it may concern:*

Be it known that I, WILLIAM A. TURBAYNE, a citizen of the United States, and a resident of Lancaster, county of Erie, and State of New York, have invented certain new and useful Improvements in Electrical Systems of Distribution, of which the following is a specification.

My invention relates to electrical systems of distribution and especially to automatic regulation of the same.

In the present instance the electrical system of distribution to which my various improvements have been applied is a system in which a storage battery and booster are employed in connection with a rotary converter or other rectifying device to steady the load on the main alternating current generator. The principal improvements herein shown in connection with this system apply to the proper rectification of currents of the regulating portion of the system. These improvements are not, in their broadest sense, limited to this general character of a system but may be applied to other regulating circuits where rectification of a regulating current is desired.

Various objects of my invention are to provide a regulating apparatus in which the regulation is properly proportional to the changes to be compensated for, to avoid sparking and other troubles incident to the common commutating devices, and generally, to provide better and more efficient regulation. To these ends I provide in the regulating circuit a rectifier having windings connected to the alternating current and the direct current sides of the regulating portions of the system, such windings being in inductive relation to magnetizable material and so arranged that substantially all the flux in said rectifier is produced by the current in said windings. This contributes to the provision of a rectifier substantially devoid of motor action and sparking and other troubles are materially decreased. In the present instance the rectifier is driven in synchronism with the alternating current of the system by a synchronous motor mechanically connected thereto. These and more specific features of my invention will be more fully understood from the detailed description given below taken in connection with the accompanying drawing forming a part of this specification.

In the drawing, Figure 1 is a diagram showing a system embodying one form of my improvements. Fig. 2 is an illustration of my improved rectifying device.

A is an alternating current generator having the circuit conductors 1, 2, 3. These conductors feed an alternating current circuit 7, 8, 9 and also conductors 4, 5, 6, connected to the primary of a transformer K, the secondary of which is connected by conductors 10, 11 and 12 to the rectifying device B, here indicated as a rotary converter having a shunt field winding B'. The rectifying device feeds the direct current circuit 13, 14 across which is the battery E and booster F. The particular form of rectifying device is not important, though if it is desired that the battery should at times take part of the load on circuit 7, 8, 9, as I prefer that it should do, the rectifying device should be reversible.

The booster F is preferably driven at approximately constant speed, and for this purpose I have indicated an induction motor H mechanically connected thereto and receiving its power from the secondary of transformer K.

F' is the field of the booster which is regulated by the resultant of two opposing potential differences, one of these opposing potential differences being that of a special dynamo G which is frequently known in the art as a counter electromotive force machine. This machine is in series with the booster field F'. The voltage on the latter and therefore the current therein and the voltage of the booster is dependent on the relation of the electromotive force of G and the opposing potential differences across the terminals of the circuit in which G and F' are located.

G' is a field coil for the counter machine. The current in the coil G' is made to vary in accordance with the condition of the alternating current circuit and preferably in direct accordance with the variations of current in the circuit 1, 2, 3. This I accomplish by providing a series transformer L, the primary of which is included in the circuit 1, 2, 3, while the secondary is connected by conductors 16, to the alternating current end of the rectifying device D, which, of course, is a comparatively small machine. The direct current end of this rectifying device is connected by conductors 17 to the terminals of the field winding G' so that the rectifying device or rotary converter D is an exciter for the counter machine G. To positively maintain synchronism this rectifying device D is mechanically connected to a synchronous motor C which is connected to the conductors 10, 11, and 12 by conductors 15. C' is a field coil of the synchronous motor C. This field coil is excited through any suitable direct current source, the diagram illustrating it as connected across the direct current circuit, 13, 14.

It will be seen that any fluctuation of current on the alternating current generator, whether due to fluctuations of load on the alternating current work circuit 7, 8, 9, or to fluctuating load on the direct current side of the system, or to changes of battery condition, will correspondingly affect the current in the circuit 16 and in the circuit 17 thus varying the counter machine field in accordance with the changes of load on the alternating current generator. The variation of the counter machine field will cause the electromotive force of the counter machine to vary accordingly and preferably this counter machine should be designed so that these variations of electromotive force are from a point below that acting upon the circuit including F' and G to a point above that acting on said circuit, thus making the booster F reversible and varying its voltage in accordance with the load on the alternating current generator. Thus the voltage of the booster is primarily affected by changes of load on generator A acting through the rectifying device on the field G' of the counter machine. This regulation of the counter machine from the alternating current circuit, causing the booster field to vary in accordance with the current in the alternating current generator, produces a battery current that will maintain a substantial constancy of current of the alternating current generator despite fluctuations of load in the working circuit, and despite changes of condition of battery, in the same way that the storage batteries with boosters have heretofore been used to steady the load on direct current generators. Thus assume that the system is adjusted so that at a given average current from generator A the booster F has no voltage and the battery neither charges nor discharges. An increase of current from the generator A will cause the changes of voltage, already described, upon the counter machine G and thereby produce an electromotive force in the booster armature F that will add itself to the electromotive force of the battery and so cause a discharge of the battery. This discharge will pass through the converter B if the additional demand is caused by the work circuit 7, 8, 9. On the other hand, if the additional demand is caused by change of condition of a work circuit connected to the direct current side of the system, then the additional battery current will pass to that work circuit. In either case the battery takes nearly all of the increased demand leaving the current of the main generator but slightly changed. In the same way, a decrease of current from the generator A from the average to which the system is adjusted, by reducing the electromotive-force of the counter machine G causes an electromotive-force of the booster in a direction to oppose a discharge of the battery. Under these circumstances current from the generator will pass through the rotary converter B to charge the battery. As already briefly pointed out such a system of regulation is very materially improved by the provision of a rectifier in the regulating circuits which has very little or substantially no motor action so that it will not tend to pump back on to the line during light loads. To this end I provide the rectifier shown diagrammatically in detail in Fig. 2 and in which M represents an armature of magnetic material having thereon the distributed windings, N. This armature with its windings revolves between the skeleton magnetizable field poles P. By skeleton magnetizable field poles I mean field pole projections of magnetizable material or capable of being magnetized but having no windings thereon which produce any useful flux such as is ordinarily produced by the main field windings in a common direct current generator, and which field pole projections serve to concentrate the flux otherwise produced in the device. The field poles P are secured to the structure O of magnetic material but neither the structure O nor the field poles P have any magnetizing windings thereon. All the magnetic flux, therefore, is produced by the current that is being rectified, so that there is no extraneous field to produce such a generator or motor action as will disturb the proper proportionality between the regulating currents and the currents of generator A.

The alternating three phase regulating current is delivered to the regulating rectifier D by means of the conductors 16 and the usual slip rings. The direct regulating current is taken therefrom by means of the commutator segments Q, brushes R and conductors 17.

The alternating three phase regulating current sets up a flux in the armature M which rotates relatively thereto. This flux, however, is kept stationary because of the opposite rotation of the armature M by the synchronous motor C. Thus the position of the flux becomes fixed and it is gathered up by the skeleton field poles P. The brushes R are placed at the points of maximum difference of potential of the windings N and the current in coil G' is therefore properly proportioned to the alternating regulating current.

Although I have shown the synchronous motor C as rotating the armature M and its windings N, the same effect may be had by rotating the commutator brushes and field structure synchronously with the alternating current and allowing the windings N to remain stationary. In this case the brushes R would follow the rotating flux and would take off current from the windings N at the points of maximum difference of potential as before. It is thus evident that many changes may be made in the system without departing from the spirit of my invention and, therefore, I do not limit myself to the particular details described.

What I claim and desire to secure by Letters Patent is:

1. The combination of an alternating current circuit and a direct current circuit, one being a regulating circuit to be governed by fluctuations in the other, a regulating coil connected to the regulating circuit, a rectifying device connecting the two circuits and having magnetic induction, distributed windings on said rectifying device connected to the alternating current circuit, said windings producing substantially all the magnetic flux in said device, a commutating device, brushes therefor and means for producing a relative rotation between said windings and said brushes.

2. The combination of an alternating current circuit and a direct current circuit, one being a regulating circuit to be governed by fluctuations in the other, a regulating coil connected to the regulating circuit, a rectifying device connecting the two circuits and having magnetic induction, windings on said rectifying device connected to the alternating current circuit, said windings producing substantially all the magnetic flux in said device, a commutating device and brushes therefor for the rectifying device and means for producing a relative rotation between said windings and said brushes in synchronism with the alternating current.

3. The combination of a three-phase alternating current circuit and a direct current circuit, one being a regulating circuit responsive to variations of current in the other, a regulating coil connected to the regulating circuit, a rectifying device having magnetizable material and windings in inductive relation thereto, said rectifier connecting the two circuits and said windings arranged to produce substantially all the magnetic flux in said device, connections from said windings to the alternating current circuit, a commutator on said device, brushes engaging said commutator connected to the direct current circuit, and a synchronous motor for producing a relative rotation between said windings and brushes in synchronism with the alternating current.

4. The combination of an alternating current circuit, a rectifying device in operative relation thereto, having magnetic induction and having substantially all of its magnetic flux produced by windings connected to said alternating current circuit, a regulating direct current circuit connected to be fed from said rectifying device, a regulating coil connected to said direct current circuit and an alternating current synchronous motor connected to drive said rectifying device.

5. The combination of an alternating current circuit and a direct current circuit, the latter being a regulating circuit carrying a current responsive to variations in the current in the alternating current circuit, a regulating coil connected to the direct current circuit, and a rectifier substantially devoid of motor action connecting said circuits and having windings arranged to produce a flux rotating relatively to said windings and means for suitably driving said rectifier.

6. The combination of an alternating current circuit and a direct current circuit, one being a regulating circuit the current in which is responsive to variations in the other, a regulating coil connected to said regulating circuit, a rectifier having magnetic induction but substantially devoid of motor action for transferring energy from one circuit to the other, and having windings connected to the alternating current circuit, and means for driving the rectifier in synchronism with the current in said windings.

7. The combination of alternating and direct current power circuits, means for transferring energy from one of said circuits to the other, a source of electromotive force connected to one of said circuits, means for regulating the output of said source including a regulating coil, and a rectifying device operatively related to one of said circuits and connected to said coil for regulating the action thereof, said rectifying device being provided with windings for producing a field which rotates relatively to said windings and in which the flux is substantially all produced by the currents in said windings.

8. The combination of alternating and direct current power circuits, means for transferring energy from one of said circuits to the other, a regulating direct current circuit and regulating means for the first mentioned direct current circuit, a rectifier supplied from the alternating current circuit and feeding the regulating direct current circuit, said rectifier having magnetizable material and windings thereon supplied from the alternating current circuit, and said rectifier being substantially devoid of motor action.

9. The combination of alternating and direct current power circuits, means for transferring energy from one of said circuits to the other, a source of electromotive force connected to the direct current circuit, means for regulating the output of said source, including a regulating coil and a rectifier feeding said coil responsive to electrical fluctuations in the alternating current circuit, said rectifier having magnetizable material and windings thereon supplied from the alternating current circuit and producing a field which rotates with respect to said windings and said windings producing substantially all the magnetic flux for said rectifier.

10. The combination of alternating and direct current power circuits, means for transferring energy from one of said circuits to the other, a source of electromotive force connected to the direct current circuit, means for regulating the output of said source, including a regulating coil and a rectifier feeding said coil responsive to electrical fluctuations in the alternating current circuit, said rectifier having magnetizable material and windings thereon supplied from the alternating current circuit and producing a field which rotates with respect to said windings and said windings producing substantially all the magnetic flux for said rectifier, and a synchronous motor for driving said rectifier in synchronism with the alternating current circuit.

11. The combination of alternating and direct current power circuits, means for transferring energy from one to the other of said circuits, a compensatory storage battery operatively related to the direct current circuit, a booster for the battery, and means for regulating the action of the booster to control the charge and discharge of the battery responsive to load fluctuations on the alternating current circuit, said means including a rectifier having magnetizable material and windings thereon responsive to fluctuations in the alternating current circuit and said windings producing substantially all the flux for the rectifier.

12. The combination of alternating and direct current power circuits, means for transferring energy from one to the other of said circuits, a compensatory storage battery operatively related to the direct current circuit, a booster for the battery, and means for regulating the booster action, said means embracing a rectifier supplied from the alternating current and having magnetic induction but being substantially devoid of motor or generator action.

13. The combination of alternating and direct current power circuits, means for transferring energy from one to the other of said circuits, a compensatory storage battery operatively related to the direct current circuit, a booster for the battery and means for regulating the action of the booster to control the charge and discharge of the storage battery responsive to load fluctuations on the alternating current circuit, said means embracing a device having magnetizable material and windings in inductive relation thereto, said windings being arranged to produce substantially all the magnetic flux of said device, a commutator for the device, brushes for the commutator and means for relatively rotating the brushes and commutator.

14. The combination of alternating and direct current power circuits, means for transferring energy from one to the other of said circuits, a compensatory storage battery operatively related to the direct current circuit, a booster for the battery, a coil for regulating the booster action to control the charge and discharge of the battery, a rectifier feeding said coil and supplied from the alternating current circuit and a synchronous motor for driving said rectifier in synchronism with the alternating current circuit, said rectifier having windings connected to produce a field rotating relatively to said windings and substantially all the flux of said rectifier being produced by said windings.

15. The combination of alternating and direct current power circuits, means for transferring energy from one circuit to the other, a source of electromotive force connected to the direct current circuit, means for regulating the action of said source, responsive to electrical fluctuations on the alternating current circuit, said means including a rectifier having skeleton magnetizable pole pieces and with an armature having distributed windings.

16. The combination of alternating and direct current power circuits, means for transferring energy from one to the other of said circuits, a compensatory storage battery operatively related to the direct current circuit, a booster for the battery, a coil for regulating the booster action to control the charge and discharge of the battery, a rectifier feeding said coil and supplied from the alternating current circuit and a synchronous motor for driving said rectifier in synchronism with the alternating current circuit, said rectifier having windings connected to produce a field rotating relatively to said windings and substantially all the flux of said rectifier being produced by said windings, said windings being on the armature of said rectifier and fed from the alternating current circuit and said rectifier having skeleton magnetizable pole pieces.

In testimony whereof, I have signed my name to this specification, in the presence of two subscribing witnesses.

WILLIAM A. TURBAYNE.

Witnesses:
A. B. BRIMMER,
C. C. EASTERBROOKS.